United States Patent

Engel

[15] 3,682,933
[45] Aug. 8, 1972

[54] DERIVATIVES OF BENZOXAZOLINE-2-ONE

[72] Inventor: Kurt Engel, Basel, Switzerland
[73] Assignee: Robapharm AG, Basel, Switzerland
[22] Filed: May 27, 1969
[21] Appl. No.: 828,390

[30] Foreign Application Priority Data

May 31, 1968 Switzerland..............8143/68

[52] U.S. Cl....260/295 F, 260/247.2 B, 260/268 BC, 260/287 R, 260/293.58, 260/307 C, 424/248, 424/250, 424/258, 424/266, 424/267, 424/272
[51] Int. Cl.............................................C07d 31/34
[58] Field of Search........................260/295 F, 307 C

[56] References Cited

UNITED STATES PATENTS 3,226,372 12/1965 Tonsignant et al.....260/307 C

OTHER PUBLICATIONS

Toyoshima, Chem. Abstracts, Vol. 69, page 2543, Item 27, 303- n (1968) Abstracting an Article Appearing in Yakugaku Zusshi, 87(12) 1967.

Primary Examiner—Alan L. Rotman
Attorney—Wenderoth, Lind & Ponack

[57] ABSTRACT

Novel compounds of the formula

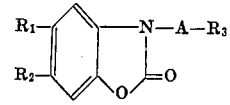

wherein $R_1$ and $R_2$ represent hydrogen, halogen, nitro or alkyl, $R_3$ represents an alkyl substituted heterocyclic amine and A represents a saturated alkylene radical, excepting compounds where A indicates ethylene and $R_3$ pyridine, useful as analgesics, antipyretics and antiphlogistics.

4 Claims, No Drawings

DERIVATIVES OF BENZOXAZOLINE-2-ONE

The present invention relates to new basic derivatives of benzoxyline-2-one of the following general formula:

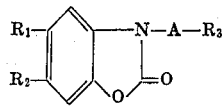

wherein the radicals $R_1$ and $R_2$, which may be the same or different radicals, mean hydrogen, halogen, nitro or alkyl radicals, $R_3$ means the radical of an alkyl substituted, heterocyclic amine, such as the pyridine, morpholine, picoline, quinoline, piperidine or pyrrolidine radical and A means a saturated alkylene radical, which may also be branched, more particularly an alkylene radical comprising two to three carbon atoms, such as the ethylene or propylene radical, with the exception of those derivatives, wherein the radical A means the ethylene radical, while the radical $R_3$ means the pyridine radical, as well as salts thereof.

As halogen atoms for the radicals $R_1$ and $R_2$ chlorine atoms or bromine atoms are preferred. The alkyl radicals are preferably lower alkyl radicals, such as methyl, ethyl radicals and so on.

In the case, where the radical $R_3$ means a pyridine radical, the radical A will be the methylene radical.

Moreover, the present invention refers to a method for manufacturing benzoxyzoline-2-one derivatives substituted in 3-position by a basic group and corresponding to the above general formula, as well as salts thereof. This new method comprises reacting a sodium salt of a substituted or unsubstituted benzoxyzoline-2-one of the following general formula:

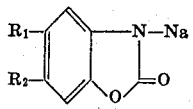

with a halide of the general formula:

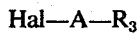

wherein the radicals $R_1$, $R_2$, $R_3$, and A have the above meanings, the reaction taking place in the presence of a solvent or diluent, such as an alcohol, dimethyl formamide etc.

The novel compounds of this invention can also be prepared by reacting the corresponding 3-halogenoalkyl-benzoxyzoline-2-one derivatives with heterocyclic amines in the presence of solvent, such as alcohol, benzene or toluene.

The new compounds of the present invention show useful pharmacodynamic properties. Some members of the novel compounds show an excellent activity as analgesics and antipyretics and, moreover, they are partly very strong antiphlogistics. Besides, they have a very low toxicity value, which fact is very surprising. The new compounds of the present invention may thus be used as medicines or as intermediate products for manufacturing pharmaceutics.

The present invention will now be described in details in the following examples, without being limited thereto.

EXAMPLE 1

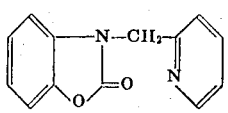

31.4 g (0.2 mole) of the sodium salt of benzoxyzoline-2-one are dissolved in 60 ml of dimethyl formamide, whereupon 28.3 g of 2-picolyl chloride (freshly distilled) are added. The mixture is then stirred for 5 hours on a water-bath and after cooling to room temperature it is poured into water. After suction and drying, 28.5 g of a raw product are obtained. When recrystallizing twice in ethanol, 32 g of the pure product of the above formula melting at 116°–117°C (71 percent of the theoretical value) are obtained.

Analysis: calculated C 69.00% H 4.42% N 12.37%
found C 69.02% H 4.45% N 12.42%

The chlorohydrate of the above compound is obtained by dissolving the resulting compound in ethanol and adding alcoholic hydrochloric acid. After having recrystallized the resultant compound twice in ethanol, the chlorohydrate melts at 213.5°–214.5°C.

Analysis: calculated C 59.50% H 4.22% N 10.66%
found C 59.66% H 4.15% N 10.65%

The corresponding sulfate is obtained by dissolving the compound obtained according to the above example in ethanol and adding 50 percent sulfuric acid. After concentration to a volume of about one-tenth of the original volume, then suction and washing with ethanol the sulfate melts at 159°–161°C.

Analysis calculated 48.14% H 3.72% N 8.64% S 9.89%
found C 48.12% H 3.77% N 8.55% S 9.86%

The compound of the above formula, in which a chlorine atom is present in 5-position, melts at 221°–225°C (as chlorohydrate).

The corresponding compound containing in 5-position a nitro group (in form of the chlorohydrate) melts at 230°–233°C, whereas the compound of the above formula, in which a nitro group is present in 6-position, melts at 171°–173°C (as chlorohydrate).

EXAMPLE 2

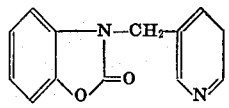

7.9 g (0.05 mole) of the sodium salt of benzoxazoline-2-one are dissolved in 20 ml of dimethyl formamide and treated with 8.6 g of 3-picolyl chloride chlorohydrate (calculated as free base) in the presence of a small quantity of ether.

Then the ether is distilled off and the reaction mixture is stirred for 5 hours on a boiling water-bath. The mixture is then cooled to room temperature and poured into a saturated sodium chloride solution. The precipitated product is sucked off and taken up into a mixture of 2N hydrochloric acid and ether. The ethereal layer is separated and the acid phase is made alkaline and extracted with acetic ester. The extract is dried over sodium sulfate and evaporated to dryness. In this way, 15 g of the raw product corresponding to the above formula are obtained. After recrystallization from ethanol, the purified product melting at 139°–141 °C is obtained. Yield: 8 g (71 percent of the theoretical value).

Analysis   calculated   N 12.37%
           found        N 12.37%

The chlorohydrate of the compound corresponding to the above formula, in which a chlorine atom is present in 5-position melts at 235°–238°C. The chlorohydrate of the compound corresponding to the above formula, in which a nitro group is present in 5-position, melts at 274°–275°C.

EXAMPLE 3

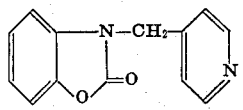

7.9 g (0.05 mole) of the sodium salt of benzoxazoline-2-one are dissolved in 20 ml of dimethyl formamide and treated with 8.6 g of 4-picolyl chloride chlorohydrate (calculated as the free base) in the presence of a small quantity of ether.

The working up is carried out in the way disclosed in Example 2. If the reaction product is recrystallized twice in ethanol, 6 g of the purified compound of the above formula are obtained. M.p. 144°–146°C.

Analysis:   calculated   N 12.37%
            found        N 12.36%

The compounds of the above structural formula comprizing in 5-position a chlorine atom and a nitro group resp. melt (as chlorohydrates) at 245°–250°C and 261°–264°C resp.

EXAMPLE 4

When working according to the method disclosed in the above Example 3, but reacting 7.9 g (0.05 mole) of the sodium salt of benzoxyzoline-2-one with 9.4 g of 6-methyl-2-picolyl chloride chlorohydrate in 20 ml of dimethyl formamide, the compound of the following formula is obtained:

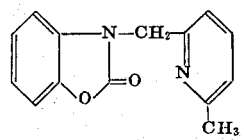

M.p. 112°–114°C; yield: 64 percent of the theory.

Analysis:   calculated   N 11.63%
            found        N 11.60%

EXAMPLE 5

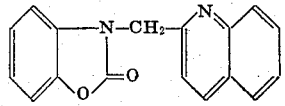

7.9 g (0.05 mole) of the sodium salt of benzoxazoline-2-one are dissolved in 20 ml of dimethyl formamide and treated with 11.2 g of 2-chloromethyl quinoline chlorohydrate (calculated as free base) in the presence of about 150 ml of benzene.

Then the benzene is distilled off and the reaction mixture is stirred for 5 hours on a boiling water-bath. After having cooled to room temperature, the reaction mixture is poured into a saturated sodium chloride solution. The precipitated product is sucked off and washed with water. The base is dissolved in a boiling mixture of 2N hydrochloric acid and ethanol (ratio 1:1) and filtered with charcoal.

After a second recrystallization, 7.5 g of the chlorohydrate of the above compound are obtained. M.p. 214°–216°C.

Analysis:   calculated   N 8.94%
            found        N 8.87%

EXAMPLE 6

One hundred and fifty-eight g of the sodium salt of benzoxazoline-2-one are interacted with 154 g of N-(2-chloroethyl)-morpholine in the presence of 200 ml of dimethyl formamide according to the following manner:

The sodium salt of benzoxazoline-2-one is dissolved in dimethyl formamide and, while stirring, (2-chloroethyl)-morpholine is added. The reaction mixture is stirred for further 4 hours at 120°C (bath temperature). Then the reaction mixture is cooled to room temperature and poured into about 300 ml of a saturated sodium chloride solution. Then the whole is extracted three times with acetic ester. After having distilled off the acetic ester, 266 g of the compound of the general formula are obtained. Yield: 222 g.

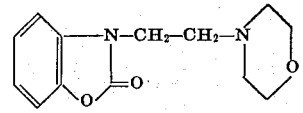

B.p 180°–182°C/0.5 mm; m.p. 65°C.

Analysis:   calculated   N 11.27%
            found        N 11.22%

The corresponding chlorohydrate can be prepared by dissolving the above compound in 2-methoxyethanol and adding alcoholic hydrochloric acid. The resultant product is recrystallized three times in 2-methoxyethanol. In this way, the chlorohydrate is obtained in form of colorless prisms. At a temperature of 244°C, the chlorohydrate becomes brown in color. It melts at 272°C.

Analysis:   calculated   C 54.83%   H 6.01%   N 9.84%   C 12.45%
            found        C 54.87%   H 6.12%   N 9.90%   C 12.39%

The chlorohydrate thus obtained is soluble in water and gives a neutral solution. Thus, it is particularly suitable for preparing aqueous injection solutions.

In an analogous way to that described in the above example, the following compounds can be prepared:

the compound comprising in 5-position a chlorine atom; m.p. 265°–268°C;

the compound comprising in 5-position a nitro group; m.p. 278°–280°C (under decomposition);

the compound comprising in 6-position a nitro group; m.p. 274°–278°C and the corresponding diethyl sulfate addition compound melting at 163°–165°C.

As far as the above compounds are concerned, the melting points given always refer to the corresponding chlorohydrates.

EXAMPLE 7

When working according to Example 2, but using the sodium salt of benzoxazoline-2-one and N-(2-chloroethyl)-piperidine in dimethyl formamide, the compound of the following formula is obtained:

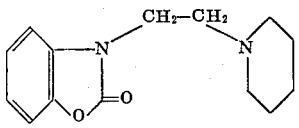

B.p. 138°–140°C/0.2 mm; m.p. 65°–67°C; yield 54 percent of the theory.

Analysis:   calculated   N 11.36%
            found        N 11.32%

When working in the way disclosed in the above Example 7, but using the corresponding starting material, the following compounds can be obtained:

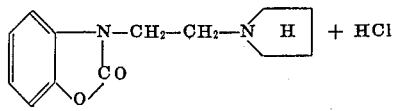

M.p. 212°–214°C

Analysis:   calculated   N 10.42%
            found        N 10.46%

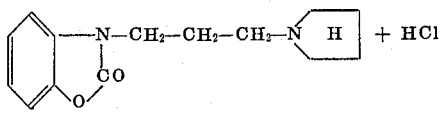

M.p. 223°–225°C

Analysis:   calculated   N 9.43%
            found        N 9.34%

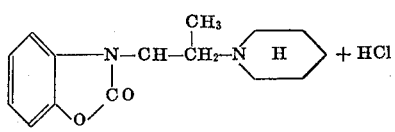

M.p. 220°–223°C

Analysis:   calculated   N 9.44%
            found        N 9.45%

Tests made with the above compound have proved that they are excellent analgesics, antipyretics and antirheumatics and that they are most compatible for human beings without showing any by-effects worthwhile to be mentioned.

Thus, many tests have been made for example with the compound obtainable according to the above Example 6. The tests carried out will be described in details in the following:

Animal tests have shown that the said compound has analgetic, antipyretic and antirheumatic properties. The said animal tests have also shown that the said compound has the same activity like the trademark products Butazolidine and Tanderil, without showing the by-effects of both the said trademark products.

Toxicity: the average lethal dose was examined for two different charges. The following values were obtained:

Mice i.v. dl 50 = 181 mg/kg (as free base) and 190 mg/kg (as chlorohydrate) resp.

Mice oral dl 50 = 957 mg/kg (as free base) and more than 1000 mg/kg (as chlorohydrate) resp.

Rats oral dl 50 = more than 1,000 mg/kg (as chlorohydrate).

With these tests the following symptoms were noticed: ataxia, coordination disturbances, opisothotonos, writhing syndrom, spams.

Analgesia: the conventional test by irritating the animals with light and heat provoked, when orally administered in quantities of 500 mg/kg, a delay of the reaction time of 42 percent, which must be considered to be important.

Antipyresis: the test with yeast-induced rats showed, even when orally administered in a quantity of 500 mg/kg, a small temperature decrease of about 1.2 degree.

Formalin edema: doses of 500 mg/kg, orally administered, produced a well reproducible antiphlogistic activity of 40 percent.

Aminooxydase: concentrations of $10^{-3}$ to $10^{-5}$ produced no retardation effect.

Narcosis potency: after administration in a subcutaneous way of doses of 25 mg/kg, a prolongation of the sleeping duration of 125 percent was noticed, which fact—compared with the activity of chloropromazine—is to be considered as a weak potency.

The said compound was tested during about 2½ months with four test persons. Seventy-three tests have been made. The doses were administered by slowly increasing the doses up to a maximum dose of 250 mg. It was surprising to notice that—contrary to the conventional compounds—the new compound did not show any by-effect and was compatible for the human stomach. No psychical aberration could be noticed.

At the end of the test series, all test persons were examined as to the blood picture. In all cases, normal values were found.

Moreover, the said compound was further tested with the same four test persons within 2–3 months by slowly increasing the rate of administration pup to doses of 1,000 mg. All test persons have very well digested the administered dosage and no undesirable by-effects could be noticed. Two of the test persons noticed a manifest decrease of pains by a dosage of 1,000 mg of the said compound. For comparison purposes, the activity of 0.3 g of the trademark product Pyramidon was tested in order to check whether Pyramidon has an activity as to the pains of the test persons. However, it was surprising to realize that none of the test persons noticed an analgetic effect. This proves that the new compound of the present invention is superior in this respect to the trademark product Pyramidon. Also, the said four test persons were, at the end of the test period, subjected to a blood examination. Normal values could be stated.

What we claim is:

1. A compound selected from the group consisting of a compound of formula

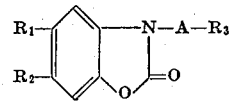

wherein $R_1$ and $R_2$, which may be the same or different, are hydrogen, halogen, nitro or lower alkyl, $R_3$ is pyridyl or picolyl, and A is a saturated alkylene of one to three carbon atoms, optionally branched, and pharmaceutically acceptable salts thereof, with the exception of that compound where A is ethylene and $R_3$ is pyridyl.

2. The compound according to claim 1, wherein the alkylene radical A is ethylene or propylene.

3. The compound according to claim 1, wherein $R_1$ and $R_2$ are chlorine, bromine, nitro, methyl or ethyl.

4. The compound according to claim 1, wherein $R_3$ is pyridyl and A is methylene.

* * * * *